United States Patent [19]

Kitaguchi et al.

[11] Patent Number: 5,099,127
[45] Date of Patent: Mar. 24, 1992

[54] PORTABLE INTENSITOMETER AND APPARATUS FOR CENTRALIZED CONTROL OF EXPOSURE USING THE INTENSITOMETER

[75] Inventors: Hiroshi Kitaguchi, Naka; Shigeru Izumi, Suginami; Satoshi Suzuki, Mito; Satoru Kawasaki, Hitachi; Masahiro Kondo, Hitachi; Shinji Mitani, Hitachi; Tatsuo Hayashi, Hitachi; Yukito Koiwa, Hitachi, all of Japan

[73] Assignee: Hitachi, Ltd., Tokyo, Japan

[21] Appl. No.: 274,998

[22] PCT Filed: Feb. 1, 1988

[86] PCT No.: PCT/JP88/00086
§ 371 Date: Sep. 30, 1988
§ 102(e) Date: Sep. 30, 1988

[87] PCT Pub. No.: WO88/05923
PCT Pub. Date: Aug. 11, 1988

[30] Foreign Application Priority Data

Feb. 2, 1987 [JP] Japan .................................. 62-20414
Apr. 13, 1987 [JP] Japan .................................. 62-88820

[51] Int. Cl.⁵ .................................................. G01T 1/02
[52] U.S. Cl. ............................. 250/370.07; 250/336.1
[58] Field of Search ............... 250/370.07, 336.1, 388, 250/372; 364/413.26; 340/600

[56] References Cited

U.S. PATENT DOCUMENTS 4,460,830 7/1984 Allemand et al. ............. 250/370.07
4,461,952 7/1984 Allemand et al. ............. 250/370.07
4,608,655 8/1986 Wolfe et al. .................... 250/370.07
4,642,463 2/1987 Thoms ............................. 250/336.1

FOREIGN PATENT DOCUMENTS

57-17892 1/1982 Japan .
60-42675 3/1983 Japan .
12377 1/1984 Japan ............................. 364/413.26
61-88175 5/1986 Japan .
238582 10/1988 Japan ............................. 250/370.07

Primary Examiner—Carolyn E. Fields
Attorney, Agent, or Firm—Antonelli, Terry, Stout & Kraus

[57] ABSTRACT

A portable intensitometer including a radioactive radiation detector, an operation processing device for digitally processing the output signal of the radioactive radiation detector, and a device which produces a processed result of the operation processing device, wherein the improvement further includes a device for storing the data of exposure history and exposure control values of an individual person, and an interface which is connected to the storage device and to said operation processing device to input or output the data relative to an external equipment. The operation processing device carries out exposure control calculation for an individual person relying upon the output signals from the radioactive radiation detector and upon the read signals from the storage device. Therefore, the daily control, weekly control and monthly control are carried out in real time for each of the individual persons, to realize perfect exposure control for the individual persons.

17 Claims, 11 Drawing Sheets

| NAME CODE | DATE OF BIRTH | SEX |
|---|---|---|
| DATE | PLACE | EXPOSURE DOSAGE |
|  |  |  |
|  |  |  |
|  |  |  |
|  |  |  |
|  |  |  |

PORTABLE INTENSITOMETER AND APPARATUS FOR CENTRALIZED CONTROL OF EXPOSURE USING THE INTENSITOMETER

TECHNICAL FIELD

The present invention relates to a portable intensitometer (pocket intensitometer) and to an apparatus for centralized control of exposure using the intensitometer. More specifically, the invention relates to a portable intensitometer which is adapted to controlling the exposure for an individual person in a facility where radioactive radiation is handled.

BACKGROUND ART

Controlling of exposure for an individual person in a facility where radioactive radiation is handled must include a daily control (control of exposure throughout a day), a weekly control (control of exposure throughout a week) and a monthly control (control of exposure throughout a month). It is accepted practice to carry out daily control and weekly control relying upon the records of everyday dosage using a conventional pocket intensitometer or a TLD (thermal luminescence detector). As for the monthly control, the person carries the TLD and a film badge with him for a month, and the dosage is controlled relying upon the readings. As described above, the exposure to the individual persons has been controlled by recording and totalizing the exposure data of daily control.

According to the above-mentioned prior art, however, no attention has been given to controlling the exposure based upon the history of exposure of the individual persons, and the totalized data after the exposure is often left unnoticed though it may have exceeded the control value.

In controlling the exposure for an individual person, furthermore, it is necessary to record and preserve the history of dosage to which he is exposed. The careful control of exposure during the work in the radioactive radiation is carried out based upon the history of dosage to which the person is exposed. However, the conventional intensitometer does not have a function for stably recording for extended periods of time the history of dosage to which the person is exposed.

DISCLOSURE OF INVENTION

The object of the present invention is to carry out daily control, weekly control and monthly control for individual persons in real time, in order to achieve perfect control of exposure for the individual persons.

Another object of the present invention is to correctly carry out not only the control for the external exposure but also the control for the internal exposure by collecting in time series the entrance data for the facilities where the radioactive radiation is treated as well as the dosage to which the person is exposed in such places.

A further object of the present invention is to provide a portable intensitometer having a function which successively stores the history of exposed dosage for every work in an integrating manner and which preserves the history for extended periods of time.

The above-mentioned objects are achieved by a portable intensitometer which comprises a radioactive radiation detector, an operation processing means for digitally processing the output signal of said radioactive radiation detector, and a means which produces a processed result of said operation processing means, and which further comprises a means for storing the data of exposure history of an individual person and exposure control values, and an interface which is connected to said storage means and to said operation processing means to input or output the data relative to an external equipment, and wherein said operation processing means carries out exposure control calculation for an individual person relying upon the output signals from said radioactive radiation detector and upon the read signals from said storage means.

Furthermore, the data related to the contamination of air are corrected at all times for each of the areas in the radioactive radiation control section, the intensitometer is provided with an ID function for controlling the entrance to and exit from the radioactive radiation-handling facility to collect and store the data related to the entrance to and exit from the areas, and the data related to the exposure dosage (trend data) are stored from time to time, thereby to grasp the condition of internal contamination of an individual person in each of the areas and to correctly evaluate the dosage of internal exposure.

Moreover, the non-volatile memory that serves as means for storing the dosage of exposure stably stores for extended periods of time the history of dosage to which an individual person was exposed. It is further recommended to detachably attach the non-volatile memory to the intensitometer in order to control the exposure for the individual persons based upon the non-volatile memory.

BEST MODE FOR CARRYING OUT THE INVENTION

Embodiments of the invention will now be explained in detail in conjunction with the drawings.

Embodiment 1

Figure 1:
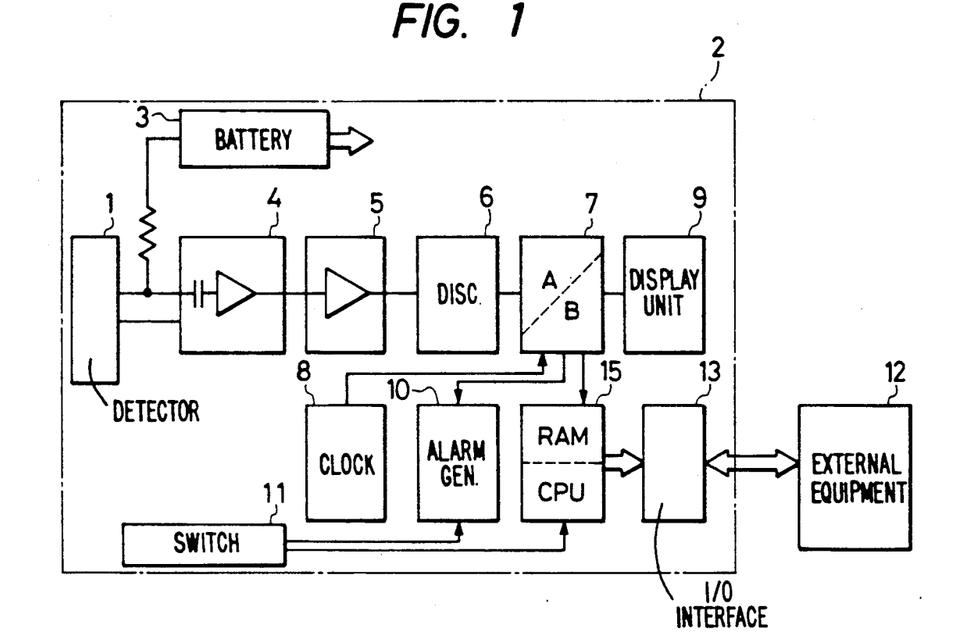
FIG. 1 is a block diagram showing the circuit of a portable intensitometer according to an embodiment of the present invention.

Circuit blocks of the portable intensitometer will now be explained in conjunction with FIG. 1. A radioactive radiation detector 1 is provided in a portable intensitometer housing 2 and is powered by a power source such as a battery 3. The radioactive radiation detector is comprised of a high-performance (small and highly sensitive) semiconductor radioactive radiation detector such as of silicon. The semiconductor radioactive radiation detector operates on a low voltage (several tens of volts) and does not require a source of high voltages. The output signal of the radioactive radiation detector 1 is amplified and is shaped for its waveform through an electric charge-type preamplifier 4 and a linear amplifier 5, and is sent to a discriminator 6 which removes electric noise components and sends only a signal component generated by the incidence of radioactive radiation to a counter 7. The counter 7 consists of an interval counter A which repeats the integration and clear according to a period of a clock 8, and a counter B which performs the integration of one day while a person is in the radioactive radiation control section; i.e., the integrating counting is performed by the two counters. The data of the counter B is successively stored in a memory (e.g., RAM) that is mounted in the intensitometer. The integrated values of the counters A and B are displayed on a display unit 9 composed of an LED or the like. This display is based on the roentgen conversion or the Gray conversion. The intensitometer 2 further includes an alarm generator 10, a switch 11 for resetting the alarm 10 and the counter 7, and I/O interface 13 for communicating the data relative to the external equipment 12, and a CPU (one-chip microprocessor) for executing the logical processings therefor.

The semiconductor radioactive radiation detector 1 consumes the electric power very little. Therefore, a battery can supply electric power for several months that will be consumed by the LED display and other components. Furthermore, the semiconductor detector 1 has a square shape measuring 10 mm × 10 mm and has a thickness of about 1 mm. Even when the amplifiers 4, 5, the counter 7 and the memory are mounted, therefore, the whole device measures about 10 cm × 8 cm × 2.5 cm, which is a size that can be carried by a person.

Figure 2:
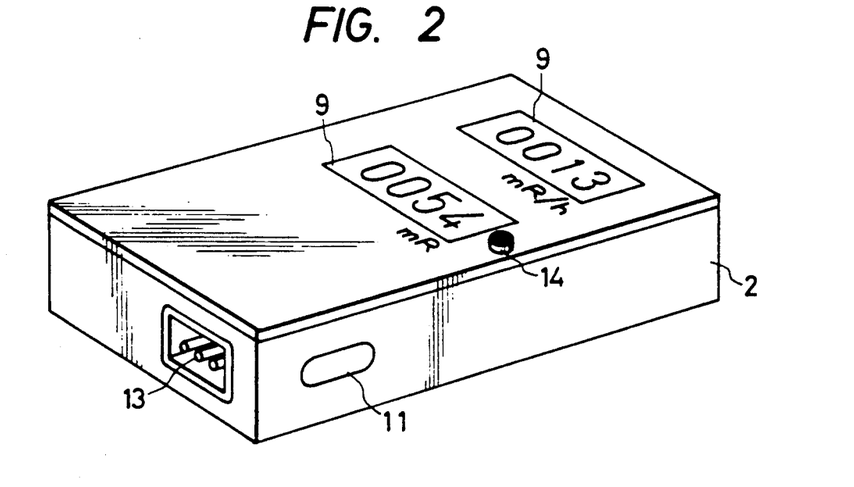
FIG. 2 is a diagram showing the appearance of the portable intensitometer according to an embodiment of the present invention.
Figure 3:
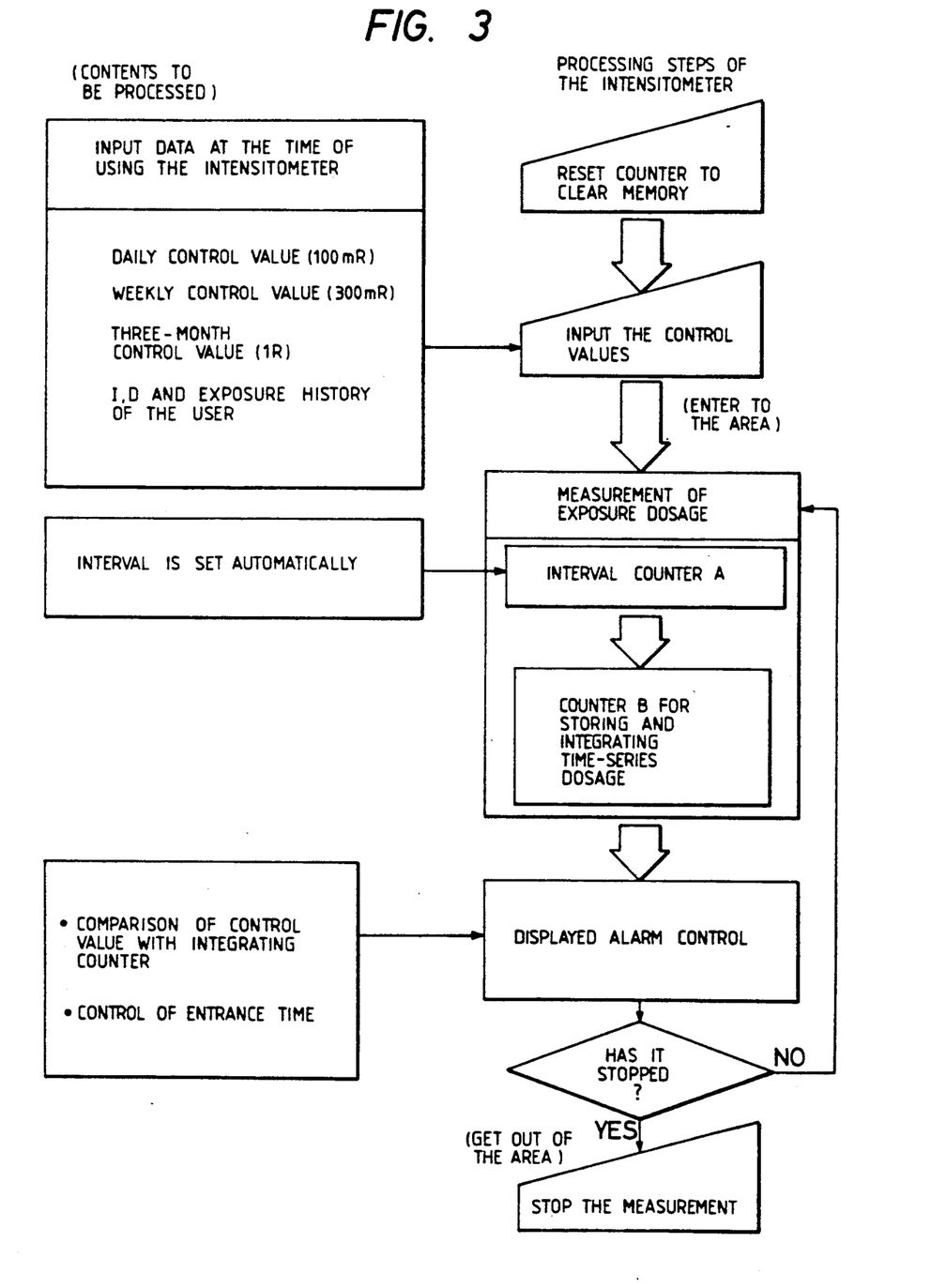
FIG. 3 is a diagram illustrating the processing steps of the portable intensitometer according to an embodiment of the present invention.

FIG. 2 shows the appearance of the portable intensitometer. The upper portion mR/h of the display unit 9 displays the content of the interval counter A, and the lower portion mR displays the integrating counter B. As for the counter B, the daily, weekly or monthly integrated exposure quantity is selectively displayed being selected by a display select switch 14. FIG. 3 illustrates the condition where the intensitometer of the present invention is used and the operation (processing steps) thereof.

Contents of the counters A, B and the memory are cleared prior to using the intensitometer of the present invention. To use the intensitometer, the data are input which are related to ID of the user, history of exposure, daily control values, weekly control values, and three-month control values. After the input of the initial values is completed, the intensitometer of the present invention is ready to be used. Carrying this intensitometer, the individual persons enter into the areas in the radioactive radiation-handling facility. To the intensitometer is input an ID data of an individual person (identification number of an individual person) so that it can also be used as an entrance permission number to the entrance gate. The intensitometer starts the measurement of exposure dosage from a moment when an individual person has entered to the area. The interval counter A corresponds to a dosage factor meter, and displays the dosage of exposure per a unit time. The counter and the interval of display make it possible to take measurement maintaining a predetermined precision at all times, and are automatically set relying upon the counted value per a unit time in the previous time. The measuring precision $\sigma$ in the counting factor is generally given by the following relation, $$\sigma = \frac{1}{\sqrt{2 \cdot N \cdot \tau}}$$

where,

N: counting factor (cpm), $\tau$: time constant.

Here, the time constant $\tau$ corresponds to the interval of the counter. From this relationship, the time constant $\tau$ should be greater than 0.5 minute to maintain a measuring precision $\sigma$ of 10% with 100 cpm. Similarly, the time constant $\tau$ is greater than 5 minutes when the measuring precision $\sigma$ is to be maintained at 10% with 10 cpm. Owing to the above-mentioned relationship, the interval according to this embodiment can be set automatically and easily. In general, the measuring precision decreases with the decrease in the counting factor. Under the conditions of low counting factors, therefore, the interval is set to be long. The object is usually accomplished sufficiently even when an interval of about one minute is simply set in an automatic manner.

The data of the counter thus measured are successively stored in the memory in the intensitometer. The memory having a memory capacity of 1 megabits is capable of storing 43 days of BCD exposure dosage data (16 bits) of four digits per a minute. Even when the four-bit data of entrace area is added to the exposure dosage data of 16 bits to constitute data of 20 bits per minute, the 1-megabit memory is capable of storing data of 34 days. This is sufficient for storing the exposure dosage control data of one month.

The integrating counter B has a function for arbitrarily and selectively displaying the daily, weekly or monthly integrated dosage.

Next, as for the alarm control, the control values and the integrated exposure dosages are compared and processed relying upon the control value that is input at the time of using the intensitometer and the data of exposure history of an individual person. The alarm is produced when, for example, 80% of the control value is reached as a result of comparison. The sound of alarm should be changed depending upon the control values, or the LED lamp display should enable the user to discriminate the control value.

The above-mentioned processing is continued from when the user has entered to the facility where the radioactive radiation is handled through up to when he goes out of the facility. To get out of the facility, the user inserts the intensitometer in the exit gate just like when he entered the facility. The gate processing causes the intensitometer to stop its measuring operation.

Figure 4:
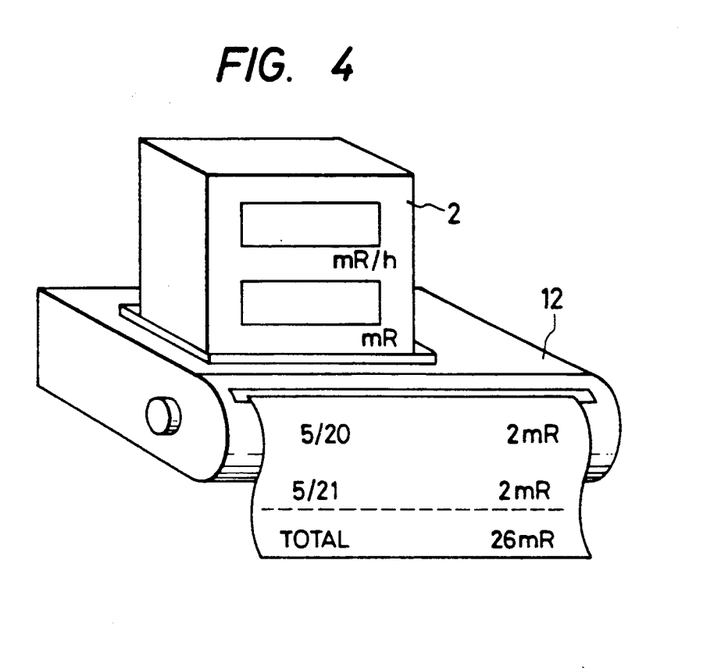
FIG. 4 is a diagram illustrating the appearance of an external equipment for reading data for use with the portable intensitometer according to an embodiment of the present invention.
Figure 5:
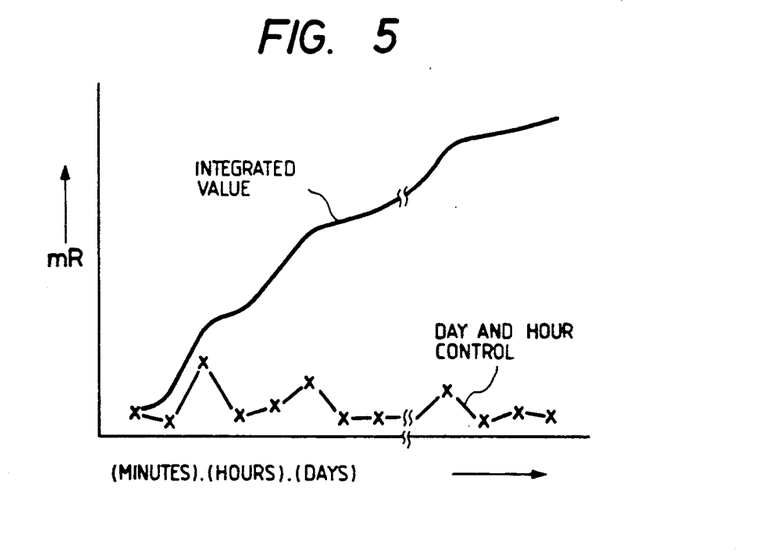
FIG. 5 is a graph showing the results of data collection using the portable intensitometer according to an embodiment of the present invention.

In the foregoing was described the operation of the present invention. When the condition of exposure up to the present moment is to be checked after coming out of the facility, the intensitometer is inserted in the external equipment 12 that is shown in FIG. 4 to read the data of exposure. The equipment can be connected to a plotter to easily obtain a graph of exposure data as shown in FIG. 5.

According to the aforementioned embodiment, the daily control, weekly control and monthly control can be carried out in real time for the individual persons to perfectly control the individual persons for the exposure. That is, the exposure control for the individual persons differs greatly depending upon the past history of exposure of the individual persons. If the data of past history of exposure of the individual persons are known, it becomes possible to exclusively determine the daily control, weekly control and monthly control on the day of the work. That is, from the condition of exposure on that day, the control values are corrected from time to time (permissible exposure dosage that remains is controlled) by taking the data of past history of exposure into consideration, and alarm corresponding to the control value corrected in real time is generated to draw attention. Furthermore, the data of exposure dosage (trend data) from time to time and the data related to the place of entrance are stored to minutely evaluate the dosage to which the individual person is exposed. The dosage of exposure includes external exposure and internal exposure, and it is quite difficult to evaluate the latter exposure. This is because the process of metabolism in the body differs greatly depending upon the kind of radioactive substances intaken in the body and their chemical condition. In the radioactive radiation control region, the data related to the contaminated air are collected at all times for each oft he areas. Therefore, if it is learned that to which area the person has entered, then it is possible to grasp the condition of internal contamination in that area and to correctly evaluate the dosage of internal exposure. The entrance and exit data to the areas can be easily collected and stored by providing the intensitometer with the ID function for controlling the entrance to and exit from the radioactive radiation-handling facility as done in the aforementioned embodiment.

Embodiment 2

Figure 6:
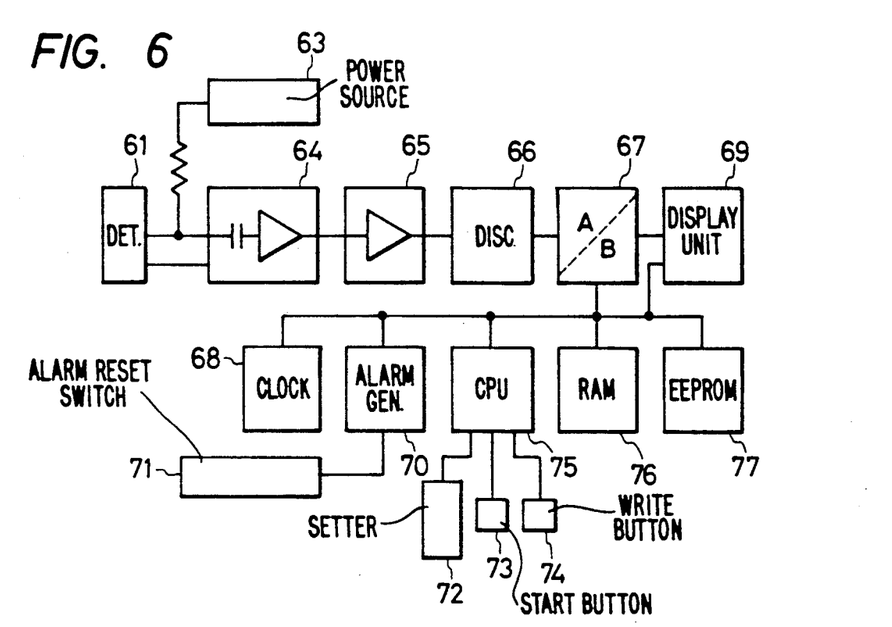
FIG. 6 is a block diagram showing the circuit of the portable intensitometer according to an embodiment of the present invention.

Another embodiment of the present invention will now be described in conjunction with FIGS. 6 to 9. In FIG. 6, reference numeral 61 denotes a small and highly sensitive semiconductor radioactive radiation detector such as of silicon. The semiconductor detector is further provided with a filter which flattens the radioactive radiation energy characteristics of the detector and energy characteristics for conversion into irradiation dosage, such that the output of the detector will vary in proportion to the irradiation dosage. Reference numeral 63 denotes a power source for operating the semiconductor detector 61. The output signal of the detector 61 is amplified and is shaped for its waveform by a preamplifier 64 and a linear amplifier 65, and is sent to a discriminator 66 which removes electric noise components from the output signal of the detector and sends only the signal component produced by the incidence of radioactive rays to a counter 67. The counter 67 is provided with an interval counter A which repeats the integration of incident radioactive rays and clear according to the period of a clock 68 and a counter B which performs the integration of one day while the person is in the radioactive radiation control section. Reference numeral 69 denotes a display unit such as of LED which displays dosage factor calculated based upon the contents of the counter A and the integrated dosage of the counter B. Reference numeral 70 denotes an alarm generator which generates alarm when the value of the counter B has exceeded a control value of exposure dosage that has been set in advance through a setter 72. Reference numeral 71 denotes an alarm reset switch, and 75 denotes a CPU (one-chip microprocessor). Reference numeral 76 denotes a RAM and 77 denotes a non-volatile memory such as an EEPROM. The RAM 76 works as a temporary data storage unit so that the CPU is allowed to execute the processing. The non-volatile memory 77 is the one into which will be stored the content of the counter B, i.e., the integrated dosage when the person has come out of the radioactive radiation control section. This memory stores the data for controlling the exposure of the individual persons.

Figure 7:
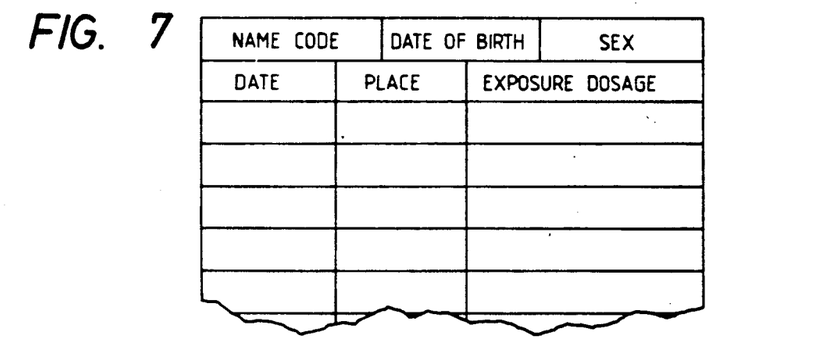
FIG. 7 is a diagram showing an example of contents stored in the storage means of the portable intensitometer according to an embodiment of the present invention.

FIG. 7 illustrates the contents stored in the non-volatile memory 77. The name, the date of birth and sex for identifying an individual person are stored in advance in the non-volatile memory as shown. Then, the history of dosage to which an individual person is exposed is stored, such as the date of exposure, the place of exposure and the dosage to which he is exposed, for every time of exposure. The history of exposure dosage of an individual person is expressed by using a total of 32 bits, i.e., 16 bits for the date, 6 bits for the place and 10 bits for the exposure dosage. If the history of exposure dosage of everyday is stored in a 0.5-megabit non-volatile memory, then the exposure history of about 45 years can be stored in this memory. This capacity is sufficient for storing the exposure history of a worker's lifetime job. Reference numeral 73 denotes a start button for starting the operation of the intensitometer, and 74 denotes a write button which causes the integrated dosage of the counter B to be stored in the non-volatile memory together with the date of exposure and place of exposure.

Figure 8:
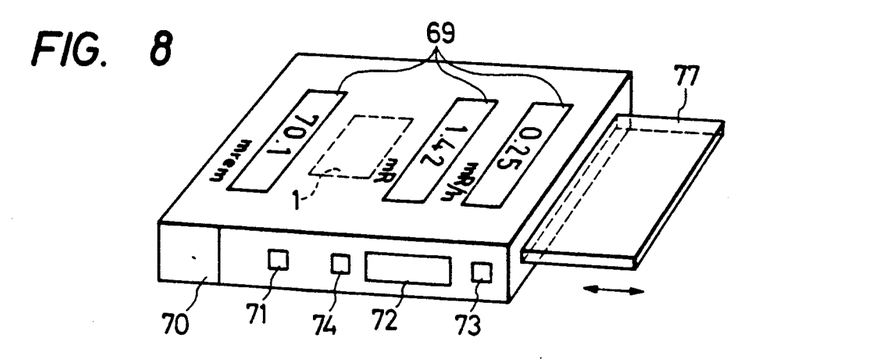
FIG. 8 is a diagram illustrating the appearance of the portable intensitometer according to an embodiment of the present invention.

FIG. 8 shows the appearance of the intensitometer of this embodiment. The non-volatile memory 77 (e.g., IC card) is removably inserted in the intensitometer; i.e., the non-volatile memory can be pulled out or inserted as indicated by an arrow. The upper portion mR/h of the display unit 69 displays the dosage factor which is calculated based upon the content of the interval counter A, and the middle portion mR displays the integrated dosage of the counter B. The lower portion mrem of the display unit 69 displays the total integrated dosage of exposure calculated based upon the data of exposure dosage history up to the present moment that are stored in the non-volatile memory 77.

Figure 9:
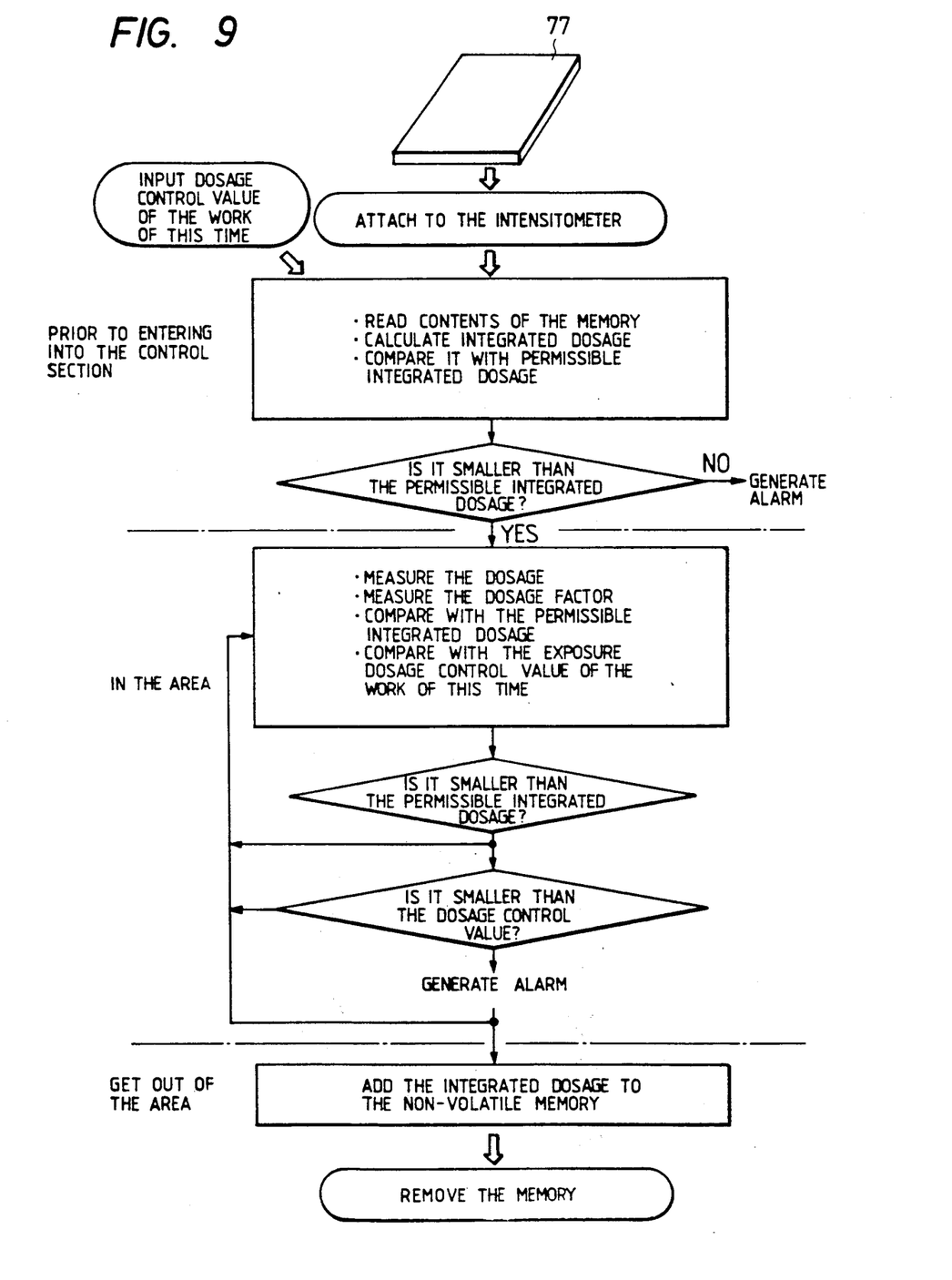
FIG. 9 is a diagram showing the processing steps of the portable intensitometer according to an embodiment of the present invention.

FIG. 9 illustrates the operation of the intensitometer according to this embodiment. Even in FIG. 9, the non-volatile memory can be removably inserted. To use the intensitometer, first, the non-volatile memory is fitted thereto, and the exposure control value $D_M$ of the user is set via the setter 72. Operation of the intensitometer is then started by the start button 73, and whereby the CPU causes the RAM to read the contents and the exposure control value in the non-volatile memory. The contents in the non-volatile memory are added, and the total integrated dosage $D_T$ up to the present moment is displayed on a portion of the display unit 69. Further, the age of an individual person is read out from the non-volatile memory to calculate the permissible dosage $D_P$ that corresponds to the age of the individual person in accordance with a relation, $$D_P = 5(N - 18) \quad N: age$$

The permissible dosage $D_P$ is then stored in the RAM. The CPU further compares the above total integrated dosage $D_T$ with the permissible dosage $D_P$, and generates the alarm when the total integrated dosage $D_T$ is in excess of the permissible dosage $D_P$. When $D_T < D_P$, it means that the person is allowed to enter into the control section, and the CPU clears the counter and starts to integrate the dosage of exposure.

The counter B continues to integrate the exposure dosage which is displayed on a portion of the display unit 69. Further, the CPU calculates the dosage factor using the counter A and RAM, and displays it on a portion of the display unit 69. The CPU further finds the sum $D_T + D_N$ of the total integrated dosage $D_T$ up to the previous time and the integrated dosage $D_N$ of the counter B of this time, compares the sum with the permissible integrated dosage $D_P$ at all times while the dosage is being measured, and generate the alarm when $D_T + D_N > D_P$. The CPU further compares $D_N$ with a control value $D_M$ and generates the alarm $D_N > D_M$. Thus, the intensitometer also monitors the dosage during the work. When the work in the radioactive radiation is finished and the person gets out of the radioactive radiation control section, he manipulates the dosage write button 74 on the intensitometer to write the integrate dosage of the counter B of this time onto the non-volatile memory together with the codes of date and place (which are set to a portion of the setter 72). After the above-mentioned operation has been finished, the non-volatile memory is removed from the intensitometer; i.e., the non-volatile memory is preserved as a record of exposure history of an individual person. If the contents of the non-volatile memory are once read by the RAM of the intensitometer, the memory may be removed prior to entering into the control section and is inserted again at the time of getting out therefrom to record the integrated dosage. As described above, the non-volatile memory which is detachably inserted can be exclusively used by an individual person, and the intensitometer can be commonly used, presenting advantage in economy. Using the non-volatile memory which is detachably inserted in the intensitometer, the history of exposure dosage of an individual person in the memory can be read by another computer to control the dosage. The exposure control system further works to back up the history of exposure dosage recorded in the non-volatile memory. Thus, by using the intensitometer of this embodiment in the exposure control system, it is made possible to totally control the radioactive radiation for the individual persons and for the groups of persons.

Instead of the above-mentioned non-volatile memory, furthermore, there can be used amemory consisting of a volatile memory such as an oridinary IC memory which contains a power source for protecting the memory. Even in this case, the memory can be taken out from the intensitometer without erasing the stored contents.

According to the aforementioned embodiment, the history of exposure dosage of individual persons can be stably preserved for extended periods of time.

Embodiment 3

Described below is the intensitometer which makes it possible to greatly simplify the calibration operation and the calibration control operation for the intensitometer.

That is, being placed in a field of standard space dosage factor, the intensitometer automatically executes the calibration processing, and automatically stores in the intensitometer the date of calibration, acceptability of calibration and calibration constants. When being used, furthermore, the intensitometer automatically reads the past records of calibration, checks the acceptability thereof as well as whether the calibration term has run out or not, and informs of the results.

Figure 10:
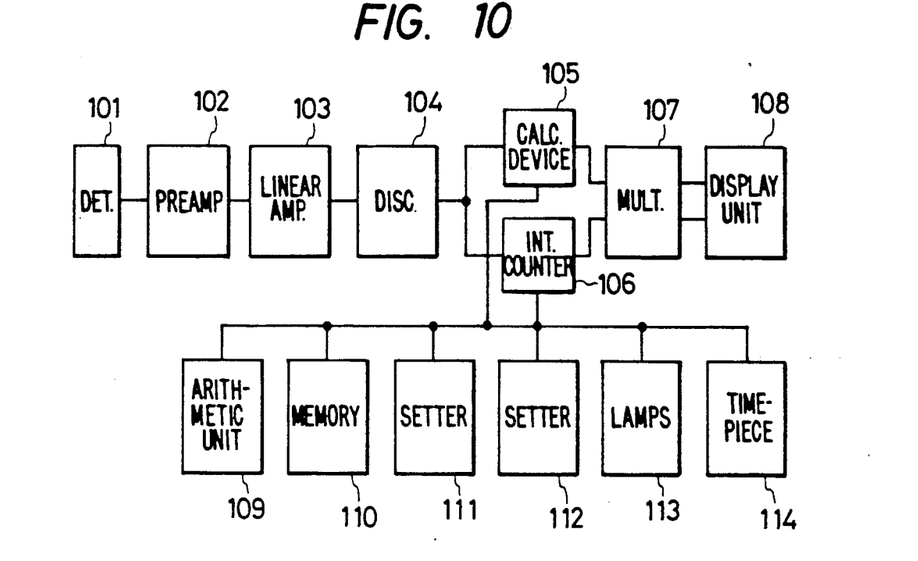
FIG. 10 is a block diagram showing the circuit of the portable intensitometer according to an embodiment of the present invention.

The embodiment will now be described in conjunction with FIGS. 10 to 14. In FIG. 10, reference number 101 denotes a radioactive radiation detector such as of a semiconductor. The output signal of the detector 101 is amplified through a preamplifier 102 and a linear amplifier 103, and is sent to a descriminator 104 which removes electric noise components from the output signal of the detector and produces only a signal component that is produced by the incidence of radioactive rays. Reference numeral 105 denotes a counting factor calculation device for finding a calculated value of incident radioactive radiation per a unit time, and 106 denotes an integrating counter which produces an integrated counted value of the incident radioactive radiation. Contents of the devices 105 and 106 are used for finding the dosage factor and the integrated dosage of the incident radioactive radiation, respectively. Reference numeral 107 denotes a multiplier which multiplies the counting factor found by the counting factor calculation device 105 and the integrated counted value found by the integrating counter 106 by a calibration constant to convert them into a dosage factor and an integrated dosage, respectively. Reference numeral 108 denotes a display unit for displaying the dosage factor and the integrated dosage, 109 denotes an arithmetic unit such as a microprocessor which executes the processing necessary for calibrating the radioactive ray measuring system, 110 denotes a non-volatile memory for storing the calibrated results and which stores the date, calibration constants and acceptability of calibration, 111 denotes a setter for setting a standard setting time necessary for the calibration or for setting a standard counted value, and reference numeral 112 denotes a setter for setting a value (mR/h) of a standard space dosage factor during the calibration. When the intensitometer is to be calibrated under the same calibration conditions, however, the values have been determined and the setter may be omitted. Reference numeral 113 denotes a group of lamps for indicating the acceptability of the calibrated result and the run-out of the calibration term, and 114 denotes a timepiece in the intensitomerter which displays the present date, time, minute and second. The electric power is kept supplied to the timepiece even when the power supply to the intensitometer is interrupted.

Figure 11:
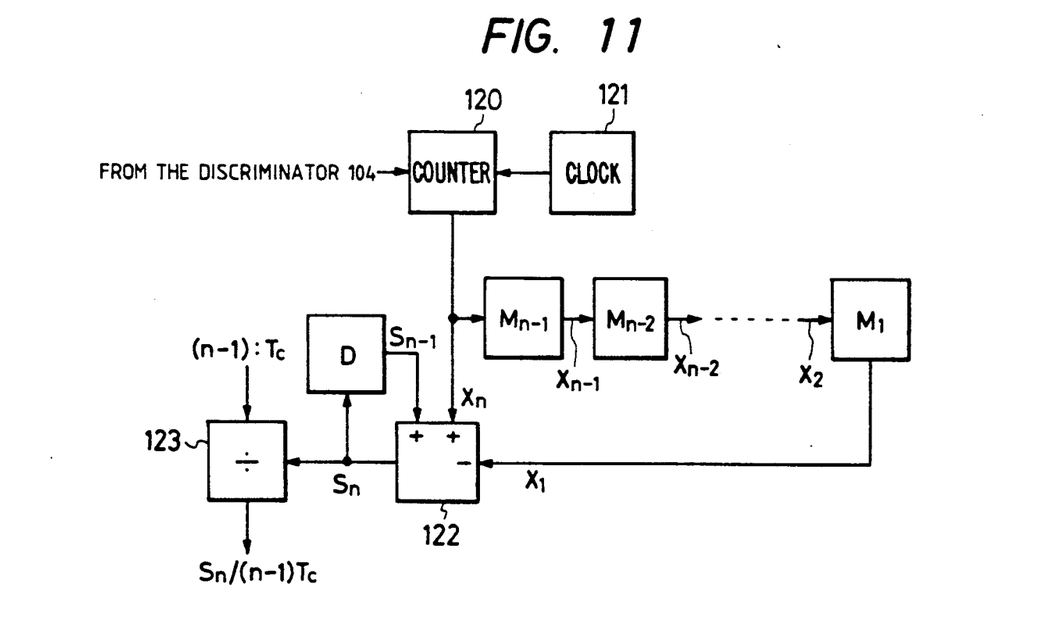
FIG. 11 is a diagram which illustrates a radioactive radiation coefficient calculation device employed for the portable intensitometer of FIG. 10.
Figure 12:
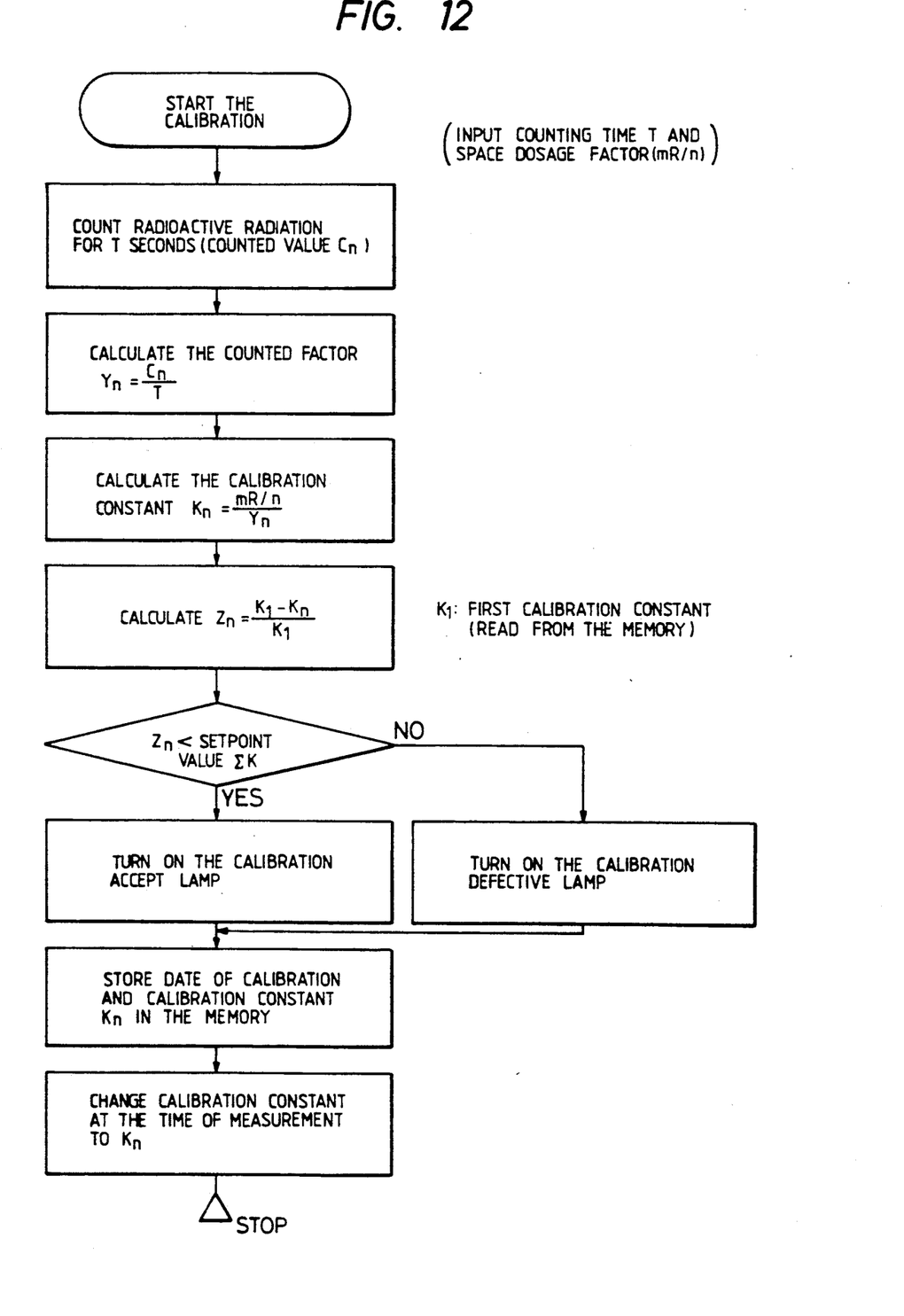
FIG. 12 is a diagram illustrating the processing steps for calibrating the intensitometer in the portable intensitometer according to an embodiment of the present invention.

FIG. 11 illustrates the counting factor calculation device according to an embodiment, wherein reference numeral 120 denotes a counter which counts the radioactive radiation signal from the discriminator 104 of FIG. 10 for a period of time $T_C$ and then clears the radioactive radiation signal, repetitively. The period $T_C$ of the operation is determined by a period generated by the clock 121. FIG. 12 is a diagram illustrating the operation of the counter 120 and wherein symbols $M_{n-1}$ to $M_1$ denote memories which as a whole work as shift registers. That is, the counted value of the counter 120 is successively shifted from $M_{n-1}$ toward $M_1$ at a timing determined by the period $T_C$ of the clock 121. Therefore, when the present counted value $X_n$ is input to the memory $M_{n-1}$, a counted value $X_1$ of the unit past (n-1)$T_C$ is input to the memory $M_1$. Reference numeral 122 denotes an adder which produces the output $S_n$, i.e., $$S_n = S_{n-1} + X_n - X_1$$

where $S_{n-1}$ denotes an output of the adder 122 at a moment that precedes the output $S_n$ by a unit $T_C$, and the output $S_{n-1}$ is obtained by delaying the output $S_n$ of the adder 122 through a memory D that works as a delay element of unit $T_C$. Symbol $S_O$ denotes an initial value which can be set to, for example, zero. Further, if the output $S_n$ of the adder 122 is divided by a delay time (n-1)$T_C$ of from $X_n$ to $X_1$, the counting factor can be found to be $S_n/(n-1)T_C$. Reference numeral 123 denotes a divider used for this purpose.

Figure 13:
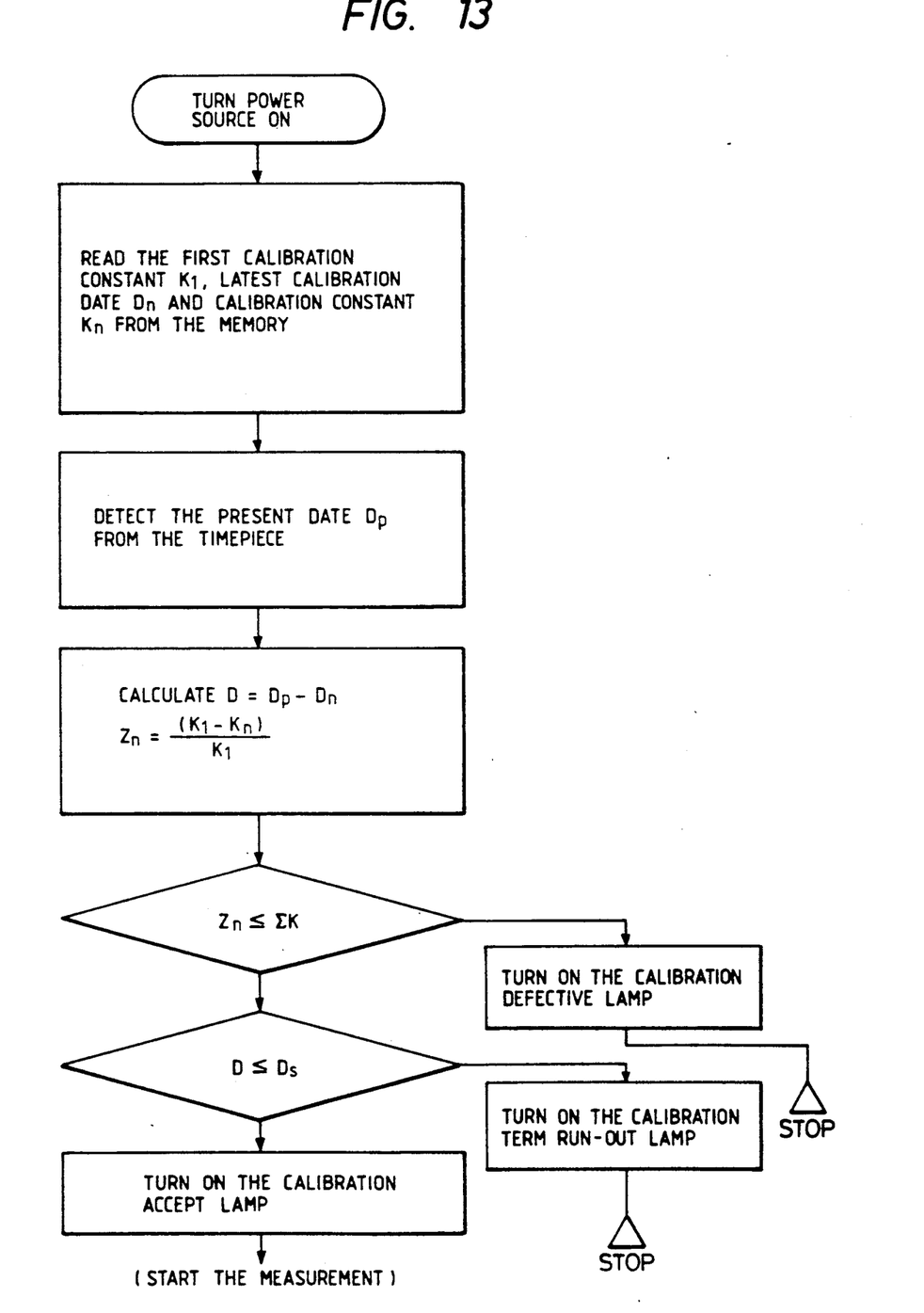
FIGS. 13 and 14 are diagrams showing the processing steps for checking the calibration prior to starting the measurement using the portable intensitometer according to an embodiment of the present invention.
Figure 14:
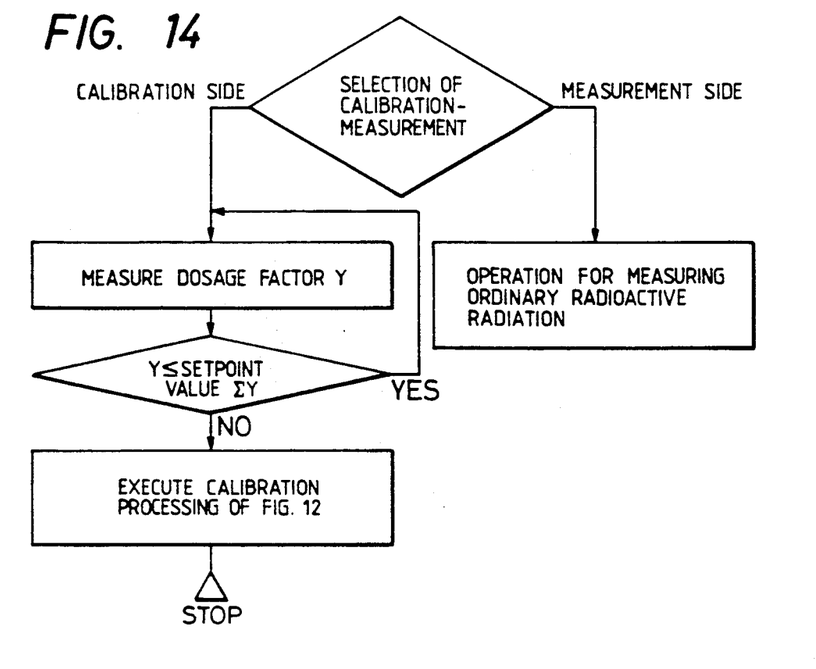

FIGS. 13 and 14 are flow charts illustrating the processing of the arithmetic unit 109 of FIG. 10. FIG. 13 illustrates the processing for calibrating the intensitometer. First, the intensitometer to which have been set a counting time T and a value (mR/h) of space dosage in a field of standard radiation source, is placed in the field of space dosage factor. Then, as the calibration start button is depressed, the integrating counter 106 in the intensitometer counts the radioactive radiation for T seconds in compliance with the process flow of FIG. 13. The counted value is denoted by $C_n$. Suffix n indicated that the calibration is of the n-th time. Next, the counting factor $Y_n = C_n/T$ and the calibration constant $K_n = [mR/h]/Y_n$ are calculated using the value $C_n$ counted for T seconds and the value mR/h. Then, a relative deviation $Z = |K_1 - K_n|/K_1$ for a calibration value $K_1$ of the first time is found, and is compared with a present value $\epsilon_k$. When $Z < \epsilon_k$, the intensitometer is in good condition, and a lamp is turned on to indicate that the calibration is good. When $Z > \epsilon_k$, the intensitometer is defective, and a lamp is turned on to indicate the defective condition. Next, the date $D_n$ of calibration obtained from the timepiece of FIG. 10 and the calibration constant $K_n$ are stored in the non-volatile memory that records the calibration, and the calibration constant usually used for the intensitometer is changed into a new calibration constant to complete the processing.

FIG. 14 illustrates calibration confirmation processing for the arithmetic unit 109 that is executed when the intensitometer is usually used, e.g., that is automatically executed when the power source circuit is connected or that is executed when a calibration checking button is depressed. For instance, when the power source is turned on, the arithmetic unit 109 automatically reads the latest calibration data $T_n$ and calibration constant $K_n$ from the non-volatile memory. The calibration constant $K_1$ of the first time is also read from the non-volatile memory. There are further read a relative deviation $Z_n = |K_x - K_n|/K_O$ in the calibration constant and the present data from the timepiece in the intensitometer to find a difference $D = D_p - D_n$ between the previous date of calibration and the present date of calibration $D_p$. These values are compared with setpoint values $\epsilon_k$ and $D_s$ that have been determined in advance. When $Z_n < \epsilon_k$ and $D > D_s$, the calibration accept lamp is turned on. When $Z_n < \epsilon$ and $D > D_s$, the calibration term lamp is turned on and when $Z_n > \epsilon_k$, the calibration defective lamp is turned on. It is further allowable to store in the non-volatile memory the acceptability of the relative deviation $Z_n$ at the time of calibration to eliminate the calculation of $Z_n$. In addition to the method of starting the calibration of the intensitometer by depressing the calibration start button, furthermore, it is also allowable to provide a calibration-measurement change-over switch instead of providing the calibration start button according to a further embodiment, so that the calibration is effected in a way as described below when the calibration-measurement change-over switch is flipped toward the calibration side. That is, FIG. 14 is a flow chart which illustrates a process that will be executed by the arithmetic unit according to this embodiment. When the calibration-measurement change-over switch is flipped to the calibration side, the radioactive radiation intensitometer counts radioactive radiation. When the counting factor Y from the counting factor arithmetic unit shown in FIG. 11 becomes greater than a predetermined value $Y_s$, the calibration function shown in FIG. 12 is permitted to work immediately or after a suitable period of delay time. When $Y < Y_s$, the calibration processing is not executed but the radioactive radiation is simply counted.

With the calibration-measurement change-over switch being flipped to the calibration side, therefore, the intensitometer automatically executes the calibration if it is placed in the field of a standard space dosage factor. For example, if the intensitometer flipped to the calibration side is placed near a standard source of radiation contained in a shielding member and if the shielding member is removed from the source of radiation by remote control operation, the counting factor of the intensitometer increases to exceed a given threshold value. In this case, the intensitometer automatically performs its own calibration after a delay time which is slightly longer than the time for removing the shielding member.

As described above, the measuring instrument is calibrated by simply placing it in the field of space dosage factor, without requiring any additional calibration apparatus except the source of standard radiation for calibration. Furthermore, the calibration operation is quite simplified. Like the portable intensitometer described earlier, this intensitometer also has a function for storing the exposure dosage of an individual person.

According to the present invention as described above, the intensitometer is provided with a calibration function. Therefore, the intensitometer is automatically calibrated by simply placing it in the field of a standard space dosage factor, making it possible to greatly simplify the calibration operation. Furthermore, the new calibration constant and the calibration date are stored in the non-volatile memory in the intensitometer, and the data of final calibration and the acceptability of the calibrated result are checked at all times whenever the measuring instrument is to be used. Therefore, the intensitometer can be used reliably and the calibration control of the intensitometer can be simplified.

Embodiment 4

Figure 15:
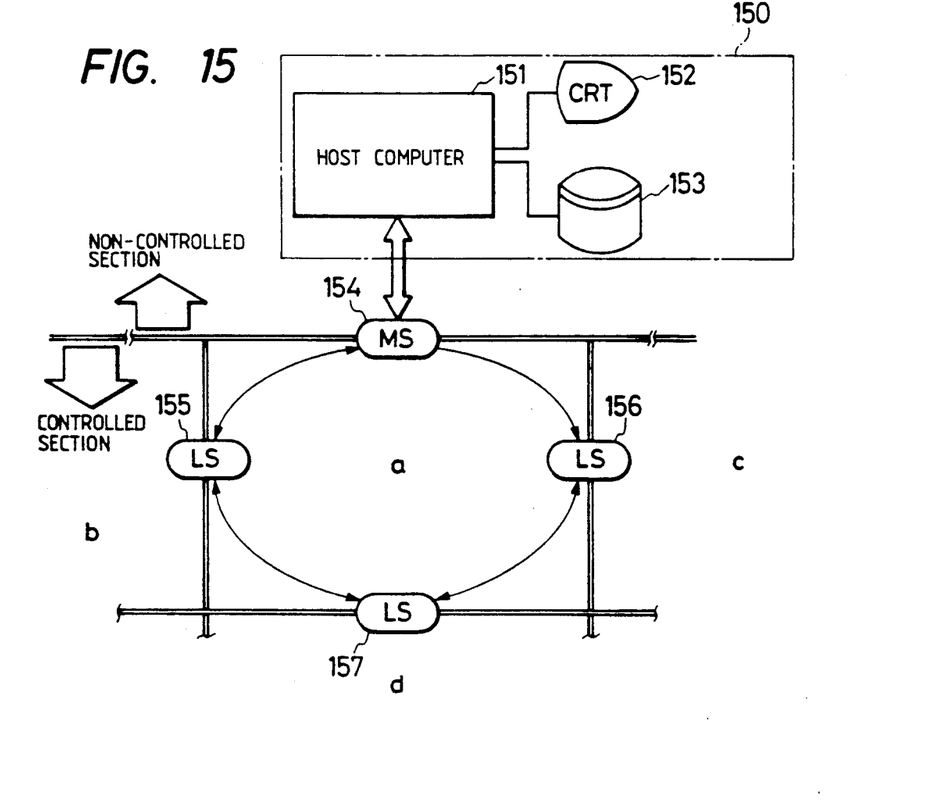
FIG. 15 is a diagram illustrating the structure of a device for the centralized control of exposure using the portable intensitometer according to an embodiment of the present invention.

FIG. 15 shows an apparatus for centralized control of exposure dosage using the intensitometer of the present invention. The radioactive radiation-handling facility includes areas a, b, c and d having different levels of radioactive radiation. To enter into the area a of this facility, the person must necessarily pass through the gate a. The gate a opens when the intensitometer is inserted in a gate terminal 154 (master station) of a, and the person is allowed to enter. Likewise, to enter into the areas b, c and d, the person must execute the passage processings at the gates b, c and d. That is, when the intensitometer is inserted in a gate terminal 155 of b, in a gate terminal 156 of c and in a gate terminal 157 (local station) of d, the gates b, c and d are opened, and the person is allowed to enter. To enter into or get out of the radioactive radiation control section, the person must necessarily pass through the gate a. Therefore, the measuring processing of the intensitometer is started when the person enters through the gate a, and the measurement of dosage is stopped through the processing at the time of getting out of the gate a (i.e., stopped when the intensitometer is inserted in the gate terminal 154 of a to open the gate a). Furthermore, the radioactive ray control is carried out in the areas a, b, c and d through the gate passage processings. Owing to these gate processings, the data related to the passage of time in which the person is in these areas and the quantity of exposure can be collected minutely. The condition of air contamination in these areas has been known from the standpoint of radioactive radiation control work. Therefore, detailed evaluation can be made in case the person is subjected not only to the external exposure but to the internal exposure as well. Further, the time of entrance of the person can be easily controlled in synchronism with when the intensitometer is operated as he enters into the area. The legal limit time of entrance is 10 minutes. Therefore, if the alarm is generated when, for example, eight hours have passed, then it is allowed to let the user of the intensitometer learn in advance the time that is remaining.

Figure 16:
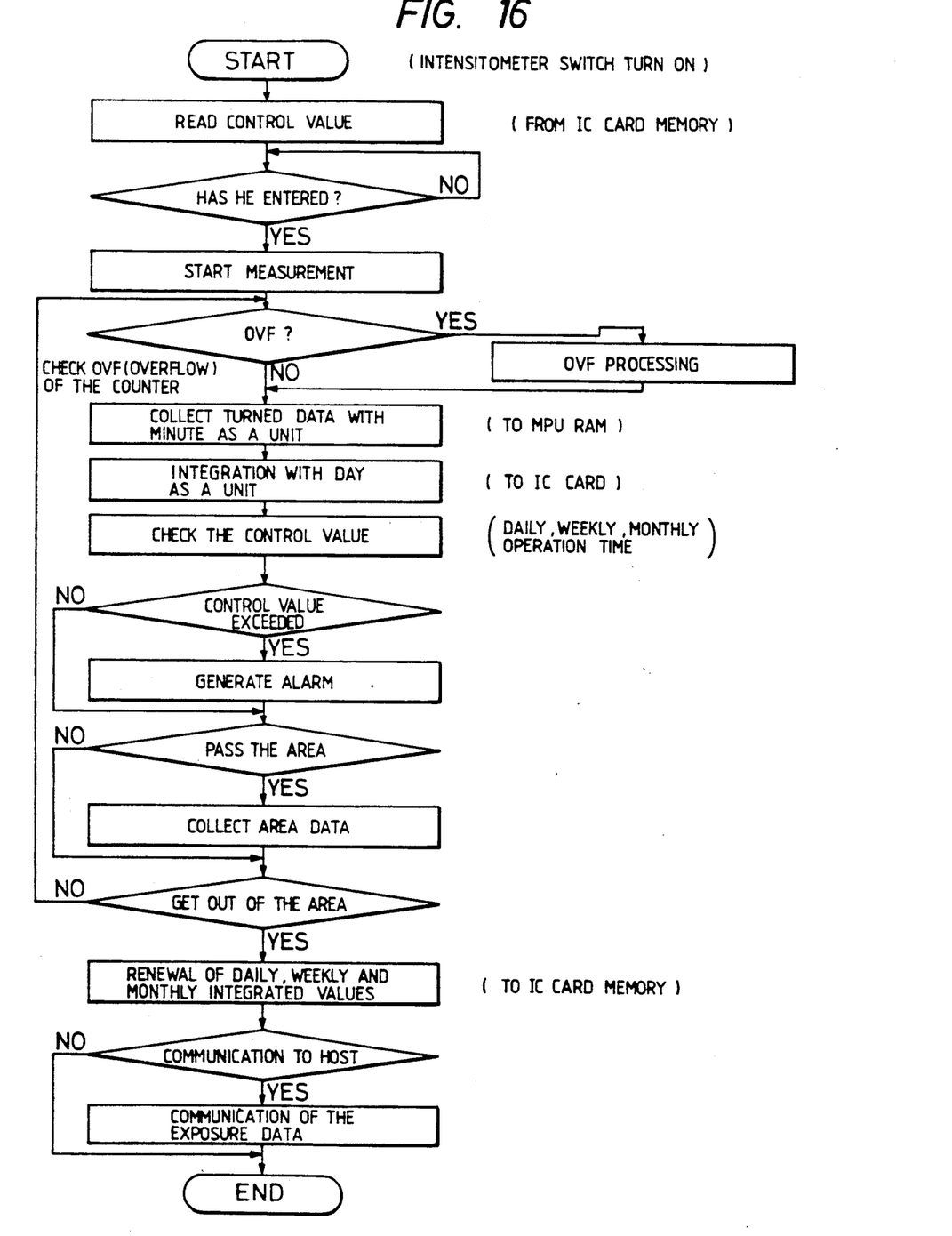
FIG. 16 is a diagram illustrating the processing steps of the portable intensitometer according to an embodiment of the present invention.

As shown in FIG. 15, furthermore, the communication is maintained between the gate terminals MS and LS, and the communication is also maintained between the gate terminal MS and a host computer 151 in a control center 150. To the host computer 151 are connected a CRT 152 and a data bank 153. FIG. 16 shows the processing steps for the above-mentioned portable intensitometer utilizing this system. By constituting the apparatus for the centralized control of exposure dosage, it is allowed to easily fabricate a system for performing the control in a centralized manner, such as grasping the number of persons in the areas, passages of their movement, exposure conditions for the individual persons, and the like. The same system can also be fabricated even when the gate terminal LS is directly connected to the host computer 151.

Embodiment 5

Figure 17:
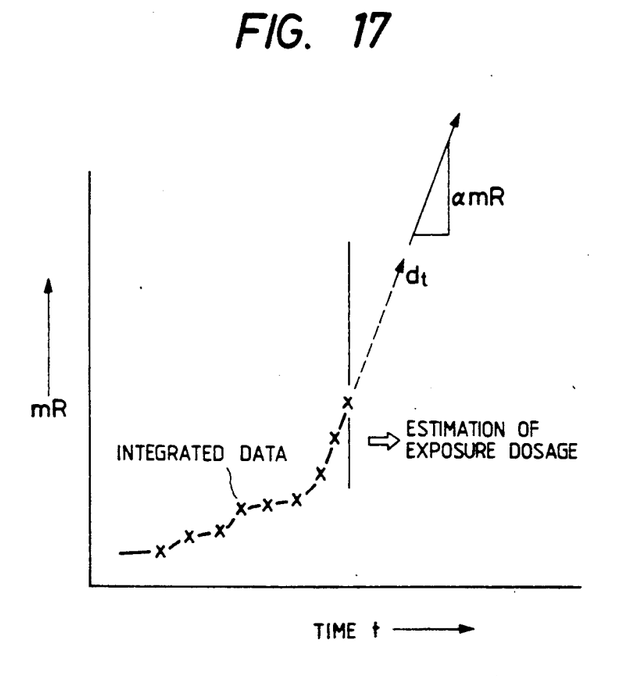
FIG. 17 is a diagram illustrating a method of estimating the amount of exposure using the portable intensitometer according to an embodiment of the present invention.

FIG. 17 shows the time-series data related to the exposure dosage. It is now presumed that the integrated data of exposure dosage increases abruptly at a given moment t. In this case, it is possible to estimate the working time T that is remaining from the exposure integrated amount R of the worker and the exposure control value $R^-$. A relationship relative to the ascending factor $dmR/dt$ of the integrated data shown in FIG. 17 is given by, $$R_L - R = dmR/dt\,T$$

From this relationship, the remaining time of work T can be informed to the worker. According to the embodiment shown in FIG. 6, furthermore, it is also possible to constitute a system which enables the individual persons to refuse the entrance into the areas where the radiation dosage is high.

What is claimed is:

1. An intensitometer capable of being carried by hand comprising a radioactive radiation detector, operation processing means for digitally processing output signals of said radioactive radiation detector, means for producing a processed result of said operation processing means, storage means for storing exposure control values and exposure history data of an individual person, and an interface which is connected to said storage means and to said operation processing means to input or output the data relative to external equipment, wherein said operation processing means carries out an exposure control calculation for an individual person relying upon the output signals from said radioactive radiation detector and upon read signals from said storage means, wherein said storage means further stores data for confirming an individual person.

2. An intensitometer according to claim 1, wherein said intensitometer is equipped with at least a data display unit, said operation processing means comprises a counter and a microprocessor, the output signals of said radioactive radiation detector are counted by said counter as an integrated quantity of exposure, and a result of the counting by said counter is received by said microprocessor and is displayed on said data display unit.

3. An intensitometer according to claim 1, wherein said storage means is detachably fitted to the body of the intensitometer.

4. An intensitometer according to claim 1, wherein said operation processing means calibrates a conversion constant between a radioactive radiation counting and a space dosage using a conversion constant between the radioactive radiation counting and the space dosage calibrated at a previous time and stored in said storage means, and inspects the acceptability thereof, and said storage means stores a result of the calibration by said operation processing means.

5. An intensitometer according to claim 4, wherein said operation processing means calibrates a conversion constant between a radioactive radiation counting and a space dosage in response to being placed in a field having a space dosage factor.

6. An intensitometer according to claim 1 wherein said exposure control calculation is carried out by said operation processing means in real time based on the output signals from the radioactive radiation detector, said exposure history data and said exposure control values stored in said storage means.

7. An intensitometer capable of being carried by hand which comprises on a piece of card substrate:
   a semiconductor radioactive radiation detecting unit;
   a memory unit for storing data of an exposure history of an individual person, an exposure control value, and individual person identifying data;
   an operation processing unit which performs an exposure control calculation for an individual person relying upon output signals of said radioactive radiation detecting unit and read signals from said memory unit; and
   an interface unit which is connected to said memory unit and to said operation processing unit, and which inputs or outputs the data relative to an external unit.

8. An intensitometer according to claim 7, wherein said memory unit is further used for storing a plurality of exposure control values.

9. An intensitometer according to claim 8, wherein said exposure control calculation is carried out by said operation processing unit in real time based on the output signals from the radioactive radiation detecting unit, said exposure history data, and said plurality of exposure control values stored in said memory unit.

10. An intensitometer according to claim 8, wherein said plurality of exposure control values stored in said memory unit include an daily exposure control value, a weekly exposure conrrol value, and a monthly exposure control value.

11. In an apparatus for centralized control of exposure for a plurality of individual persons based on exposure control data of the individual persons in a control center, the improvement comprising a card data reader provided at each of a plurality of entrance/exit gates in a radioactive radiation control section, means for opening and closing the entrance/exit gates based upon individual person confirmation data sent from said card data reader, data circuits that connect said control center to said card data reader, and a card, wherein exposure control data of the individual persons read from the card are transmitted to the control center via the data circuits, and said card is an intensitometer capable of being carried by hand which comprises:
   a semiconductor radioactive radiation detector;
   storage means for storing data of an exposure history of an individual person, an exposure control value, and individual person confirmation data;
   operation processing means for effecting exposure control calculation of the individual persons based upon output signals of said radioactive radiation detector and read signals from said storage means; and
   an interface which is connected to said storage means and to said operation processing means to input or output the data relative to an external unit.

12. An intensitometer according to claim 11, wherein said operation processing means comprises a counter and a microprocessor, the output signals of said radioactive radiation detector are counted by said counter as an integrated quantity of exposure, and a result of the counting by said counter is received by said microprocessor.

13. An intensitometer according to claim 11, wherein said storage means is further used for storing a plurality of exposure control values.

14. An intensitometer according to claim 13, wherein said exposure control calculation is effected by said operation processing means in real time based on the output signals form the radioactive radiation detector, said exposure history data, and said plurality of exposure control values stored in said storage means.

15. An apparatus according to claim 13, wherein said exposure control values stored in said storage means include a daily exposure control value, a weekly exposure control value, and a monthly exposure control value.

16. An intensitometer capable of being carried by hand comprising a radioactive radiation detector, operation processing means for digitally processing output signals of said radioactive radiation detector, means for producing a processed result of said operation processing means, storage means for storing exposure control values and exposure history data of an individual person, and an interface which is connected to said storage means and to said operation processing means to input or output the data relative to external equipment, wherein said operation processing means carries out an exposure control calculation for an individual person relying upon the output signals from said radioactive radiation detector and upon read signals from said storage means, wherein said storage means is a non-volatile memory for recording identification codes and a history of exposure dosage of an individual person.

17. An intensitometer capable of being carried by hand comprising a radioactive radiation detector, operation processing means for digitally processing output signals of said radioactive radiation detector, means for producing a processed result of said operation processing means, storage means for storing exposure control values and exposure history data of an individual person, and an interface which is connected to said storage means and to said operation processing means to input or output the data relative to external equipment, wherein said operation processing means carries out an exposure control calculation for an individual person relying upon the output signals form said radioactive radiation detector and upon read signals from said storage means, wherein said exposure control values stored in said storage means include a daily exposure control value, a weekly exposure control value, and a monthly exposure control value.

* * * * *